United States Patent
Kato et al.

[11] Patent Number: 5,459,019
[45] Date of Patent: Oct. 17, 1995

[54] OPTICAL TAPE

[75] Inventors: Kenji Kato, Yokohama; Hidemi Yoshida, Atsugi, both of Japan

[73] Assignee: Diafoil Hoechst Company, Limited, Tokyo, Japan

[21] Appl. No.: 234,635

[22] Filed: Apr. 28, 1994

Related U.S. Application Data

[63] Continuation of Ser. No. 999,526, Dec. 30, 1992, abandoned.

[30] Foreign Application Priority Data

Jan. 7, 1992 [JP] Japan ..................... 4-001050
Jan. 7, 1992 [JP] Japan ..................... 4-001053
Jan. 30, 1992 [JP] Japan ..................... 4-015311

[51] Int. Cl.$^6$ ..................................... G11B 7/24
[52] U.S. Cl. .................. 430/271; 430/945; 424/480; 424/694 SG; 369/244
[58] Field of Search ..................... 428/694 SG, 480; 430/271, 495, 945; 369/287, 288, 284

[56] References Cited

U.S. PATENT DOCUMENTS

| | | | |
|---|---|---|---|
| 3,983,285 | 9/1976 | Riboulet et al. | 428/212 |
| 4,568,599 | 2/1986 | Ono et al. | 428/141 |
| 4,798,759 | 1/1989 | Dallman et al. | 428/220 |
| 4,906,498 | 3/1990 | Ichikawa et al. | 428/64 |
| 5,188,891 | 2/1993 | Takeda et al. | 428/323 |
| 5,382,463 | 1/1995 | Adkins et al. | 428/141 |

FOREIGN PATENT DOCUMENTS

| | | |
|---|---|---|
| 0176017 | 4/1986 | European Pat. Off. . |
| 0238985 | 9/1987 | European Pat. Off. . |
| 0331746 | 9/1989 | European Pat. Off. . |
| 57-33447 | 2/1982 | Japan . |
| 57-033447 | 2/1982 | Japan . |
| 62-132251 | 6/1987 | Japan . |
| 62-181338 | 8/1987 | Japan . |
| 62-181338 | 8/1987 | Japan . |
| 1-286130 | 11/1989 | Japan . |

OTHER PUBLICATIONS

English language Abstract of JP 4–212733, Tsujioka et al., "Optical Recording Medium", Aug. 1992.

*Primary Examiner*—Charles L. Bowers, Jr.
*Assistant Examiner*—John A. McPherson
*Attorney, Agent, or Firm*—Foley & Lardner

[57] ABSTRACT

Disclosed herein is an optical tape comprising: a substrate whose a center-line average roughness ($Ra^B$) on the surface of one side is not more than 0.005 μm and the number of coarse protuberances having a height of not less than 0.10 μm in the surface of that side is not more than 10 protuberances/cm$^2$, and an optical recording layer formed on the surface whose the $Ra^B$ is not more than 0.005 μm.

43 Claims, No Drawings

OPTICAL TAPE

This application is a continuation of application Ser. No. 07/999,526, filed Dec. 30, 1992, now abandoned.

BACKGROUND OF THE INVENTION

The present invention relates to an optical tape capable of recording and reproduction of information by the irradiation of light. More particularly, the present invention relates to an optical tape which is remarkably improved in recording and reproducing characteristics for information to be recorded.

Hitherto, magnetic recording media have been popularly used as information-recording tape. However, request for improvement of information-recording density has enhanced recently, and as an answer to such request, a recording device utilizing an optical recording and reproducing system has been proposed.

For example, Japanese Patent Application Laid-Open (Kokai) No. 57-33447 (1982) discloses a tape obtained by coating a plastic base film with a Te—As—Se metal film so as to have about 1,000 Å in thickness and selectively forming the micropores in the metallic film by laser beams, and a tape obtained by coating the plastic base film with a mixture of carbon and nitrocellulose.

Japanese Patent Application Laid-Open (Kokai) No. 62-132251 (1987) discloses an optical tape produced by depositing Te—Se alloys, Se—In—Sb alloys or Ag—Zn alloys on a polyimide base film by means of Re-magnetron sputtering, and further forming thereon a protective layer.

Also, in Japanese Patent Application Laid-Open (Kokai) No. 1-286130 (1989) is disclosed an optical tape in which a magneto-optical layer is formed on one side of a base film and an anti-reflective layer is formed on the opposite side of the base film.

Although various types of optical tape have been proposed as mentioned above, the base materials used for such optical tapes had their own merits and demerits and there has yet been available no optical tape which is favorably put to practical use.

Polyester film is suited for use as a substrate of optical tape, as this film has excellent chemical, mechanical and thermal properties and it is also relatively easy to obtain a polyester film with a flat and smooth surface. However, a biaxially oriented polyester film with a flat and smooth surface had the problem that it tends to suffer damages such as scratching in the manufacturing process, thereby giving a bad influence upon the optical recording characteristics of the optical tape made by using the said polyester film.

Further, the optical tape using as its base film a polyester film having a flat and smooth surface could not be put to practical use because of poor slipperiness in the polyester film manufacturing process and the optical recording layer-forming process or in the optical tape running system. Also, the optical tape using as its base film a polyester film with good slipperiness does not show good reproducing characteristics when recording or reproduction of information is conducted with an optical recording and reproducing system. This is due to the fact that when the surface roughness of the substrate is high, although the running properties of the tape are superior, the optical reproducing characteristics lower, while when the flatness and smoothness of the surface of the substrate is improved, although the optical reproducing characteristics are superior, the running of the tape is deteriorated.

As a result of endeavors for solving these problems, it has been found that by using a specific substrate wherein a center-line average roughness ($Ra^B$) of the surface on one side thereof is not more than 0.005 μm and the number of coarse protuberances having a height of not less than 0.10 μm in the surface on the same side is not more than 10 protuberances/cm2, the obtained optical tape is also excellent in optical recording and reproducing characteristics. The present invention has been achieved on the basis of this finding.

SUMMARY OF THE INVENTION

In a first aspect of the present invention, there is provided an optical tape comprising a substrate whose a center-line average roughness ($Ra^B$) on the surface of one side is not more than 0.005 μm and the number of coarse protuberances having a height of not less than 0.10 μm in the surface of the same side is not more than 10 protuberances/cm2, and an optical recording layer formed on the surface whose the $Ra^B$ is not more than 0.005 μm.

In a second aspect of the present invention, there is provided an optical tape comprising a substrate whose a center-line average roughness ($Ra^B$) on the surface of the one side is not more than 0.005 μm and the number of coarse protuberances having a height of not less than 0.10 μm in the surface of the same side is not more than 10 protuberances/cm2, and whose a center-line average roughness ($Ra^A$) on the surface of the other side is 0.005 to 0.2 μm, and an optical recording layer formed on the surface whose the $Ra^B$ is not more than 0.005 μm.

In a third aspect of the present invention, there is provided an optical tape comprising a substrate whose a center-line average roughness ($Ra^B$) on the surface of one side is not more than 0.005 μm, and wherein a heat shrinkage in the machine direction after 30-minute heat-treatment at a temperature of 150° C. is not more than 2.5% and an optical recording layer formed on the surface whose the $Ra^B$ is not more than 0.005 μm.

In a fourth aspect of the present invention, there is provided an optical tape comprising a substrate whose a center-line average roughness ($Ra^B$) on the surface of one side is not more than 0.005 μm and a center-line average roughness ($Ra^A$) on the surface of the other side is 0.005 to 0.2 μm, and wherein a heat shrinkage in the machine direction after 30-minute heat-treatment at a temperature of 150° C. is not more than 2.5%, and an optical recording layer formed on the surface whose the $Ra^B$ is not more than 0.005 μm.

In a fifth aspect of the present invention, there is provided an optical tape comprising a substrate whose a center-line average roughness ($Ra^B$) on the surface of one side is not more than 0.005 μm and wherein the content of deposited low-molecular weight components is less than 0.8 wt %, and an optical recording layer formed on the surface whose the $Ra^B$ is not more than 0.005 μm.

In a sixth aspect of the present invention, there is provided an optical tape comprising a substrate whose a center-line average roughness ($Ra^B$) on the surface of one side is not more than 0.005 μm and a center-line average roughness ($Ra^A$) on the surface of the other side is 0.005 to 0.2 μm, and wherein the content of deposited low-molecular weight components is less than 0.8 wt %, and an optical recording layer formed on the surface whose the $Ra^B$ is not more than 0.005 μm.

In an seventh aspect of the present invention, there is provided an optical tape comprising a substrate whose a center-line average roughness ($Ra^B$) on the surface of one side is not more than 0.005 μm and a center-line average roughness ($Ra^A$) on the surface of the other side is 0.005 to 0.2 μm, and wherein a heat shrinkage in the machine direction after 30-minute heat-treatment at a temperature of 150° C. is not more than 2.5% and the content of deposited low-molecular weight components is less than 0.8 wt %, and an optical recording layer formed on the surface whose the $Ra^B$ is not more than 0.005 μm.

DETAILED DESCRIPTION OF THE INVENTION

The "polyester" in the polyester film used in the present invention which constitutes the substrate for the optical recording layer means polyethylene terephthalate in which not less than 80 mol % of the structural units is ethylene terephthalate, polyethylene naphthalate in which not less than 80 mol % of the structural units is ethylene naphthalate, or Poly-1,4-cyclohexanedimethylene terephthalate in which not less than 80 mol % of the structural units is 1,4-cyclohexanedimethylene terephthalate.

As the copolymer components other than the primary constituents mentioned above, there can be used, for instance, diols such as diethylene glycol, propylene glycol, neopentyl glycol, polyethylene glycol and polytetramethylene glycol, dicarboxylic acids such as isophthalic acid, adipic acid, azelaic acid, sebacic acid and their ester-forming derivatives, and oxymonocarboxylic acids such as oxybenzoic acid and its ester-forming derivatives.

In the optical tape, the thickness of the optical recording layer comprising a recording layer, a dielectric layer and a reflective layer which are formed by a sputtering process etc. is usually less than 1 μm, so that the surface condition of the substrate is represented as unevenness of the recording layer, which becomes a cause of noise at the time of recording or reproducing by an optical recording and reproducing system. It is, therefore, desirable that the surface of the substrate on the optical recording layer side is as flat and smooth as possible. The center-line average roughness ($Ra^B$) on the surface of the optical recording layer side of the polyester film is not more than 0.005 μm, preferably not more than 0.003 μm. If the $Ra^B$ of the substrate exceeds 0.005 μm, the optical recording characteristics of the tape may be deteriorated.

The number of the coarse protuberances having a height of not less than 0.10 μm in the surface on the optical recording layer side of the substrate is not more than 10 protuberances/cm$^2$, preferably not more than 2 protuberances/cm$^2$, more preferably 0 protuberance/cm$^2$.

When the center-line average roughness ($Ra^B$) of the surface on the optical recording layer side thereof is not more than 0.005 μm and the number of the coarse protuberances having a height of not less than 0.10 μm in the said surface is not more than 10 protuberances/cm$^2$, the optical tape produced by using such a substrate is remarkably lessened in noise and dropout at the time of recording or reproduction.

The center-line average roughness ($Ra^A$) of the surface on the side opposite from the optical recording layer is preferably in the range of 0.005 to 0.2 μm in view of the running properties of the optical tape.

The substrate used for the optical tape according to the present invention may be a polyester film only, but a substrate having the following structures is preferred.

(1) A substrate comprises a biaxially oriented polyester film having a surface whose a center-line average roughness ($Ra^B$) is not more than 0.005 μm and the number of the coarse protuberances having a height of not less than 0.10 μm is not more than 10 protuberances/cm$^2$; and a coating layer (A) or a co-extruded polyester layer (A) which is formed on one side of the said biaxially oriented polyester film and has a surface whose a center-line average roughness ($Ra^A$) is 0.005 to 0.2 μm.

(2) A substrate comprises a biaxially oriented polyester film having a surface whose a center-line average roughness ($Ra^A$) is 0.005 to 0.2 μm; and a co-extruded polyester layer (B) which is formed on one side of the said biaxially oriented polyester film and has a surface whose a center-line average roughness ($Ra^B$) is not more than 0.005 μm and the number of the coarse protuberances having a height of not less than 0.10 μm is not more than 10 protuberances/cm$^2$.

(3) A substrate comprises a biaxially oriented polyester film, and (i) a coating layer (A) having a surface whose a center-line average roughness ($Ra^A$) is 0.005 to 0.2 μm and a co-extruded polyester layer (B) having a surface whose a center-line average roughness ($Ra^B$) is not more than 0.005 μm and the number of the coarse protuberances having a height of not less than 0.10 μm is not more than 10/cm$^2$, or (ii) a co-extruded polyester layer (A) having a surface whose a center-line average roughness ($Ra^A$) is 0.005 to 0.2 μm and another co-extruded polyester layer (B) having a surface whose a center-line average roughness ($Ra^B$) is not more than 0.005 μm and the number of the coarse protuberances having a height of not less than 0.10 μm is not more than 10/cm$^2$.

The term of "co-extruded polyester layer" means a film produced simultaneously with the polyester film by co-extrusion.

The biaxially oriented polyester film and the co-extruded polyester layer (B) which have the above-described surface characteristics (i.e. the center-line average roughness (Ra)= not more than 0.005 μm, and the number of the coarse protuberances having a height of not less than 0.10 μm=not more than 10/cm$^2$), may contain the added particles, precipitated particles and other catalyst residues, but as such polyester film and co-extruded polyester layer (B), a polyester film which is substantially free of such particles is more preferred. The term of "substantially free of such particles" means that the content of the particles having a particle size of not less than 0.25 μm is not more than 0.05 wt %.

The polyester film used in the present invention may contain, if necessary, other additives such as antistatic agent, stabilizer, lubricant, anti-blocking agent, antioxidant, colorant, light shielding agent, ultraviolet absorber, etc. It is also possible to blend other polymers such as polyamides, polyolefins, polycarbonates, etc., in an amount not exceeding 10% by weight. However, such polymer should be added within the range not causing excessive lowering of crystallinity or excessive roughening of the film surface.

For forming the biaxially oriented polyester film and co-extruded polyester layer (B) which have the surface characteristics specified in the present invention (i.e. the center-line average roughness (Ra)=not more than 0.005 μm, and the number of the coarse protuberances having a height of not less than 0.10 μm=not more than 10/cm$^2$), it is preferable to use a polymer with a minimized content of antimony compounds in the polymerization catalyst. The content of antimony compounds in the polymerization catalyst is usually more than 200 ppm (calculated as metallic antimony) based on the polymer, but since these antimony compounds are causative of formation of coarse protuberances, it is recommended to reduce the content of antimony compounds in the polymerization catalyst to not more than 100 ppm, preferably not more than 50 ppm, for obtaining the film surface characteristics of the present invention.

It is also preferable for suppressing formation of coarse protuberances to carry out the polymerization under an environment with a high degree of cleanness and to set a filter with a small mesh size in the polymerization line.

A polyester polymerized so as to inhibit formation of coarse protuberances as described above is melt-extruded and quickly cooled on a casting drum to form an amorphous sheet, and then biaxially stretched the resultant amorphous sheet to obtain a polyester film having a flat and smooth surface used in the present invention. The film forming operation, too, is preferably carried out under an environment with a high degree of cleanness.

The thickness of the biaxially oriented polyester film is 0.5 to 99.5 μm. The thickness of the co-extruded polyester layer (B) is 0.5 to 99.5 μm.

The coating layer (A) whose a center line average roughness ($Ra^4$) is 0.005 to 0.2 μm, used in the present invention is composed of a resin binder and a lubricant. Although various known methods are usable for forming the coating layer, it is preferred to employ a method in which a lubricant and a resin binder are dispersed in water or an organic solvent to prepare a coating solution and the prepared coating solution is applied on the surface of the polyester film, and dried.

As the lubricant, particles, lubricating materials, and vertical protuberance-forming resins are usable.

As the particles usable as the lubricant in present invention, inorganic particles such as alumina, silica, titanium oxide, kaolin, molybdenum sulfide and the like; particles of a polymer such as polyester, polyamide, polyacrylate, polysulfone, polyphenylene oxide, polyimide, epoxy resin, crosslinked styrene resin, crosslinked acryl resin, crosslinked benzoguanamine resin, crosslinked melamine resin and the like; carbon particles; and particles of metallic alkoxide hydrolyzates may be exemplified. The average particle diameter thereof is preferably 0.005 to 2 μm, more preferably 0.01 to 0.5 μm. If the particle size is too small, the particles tend to aggregated with each other, thereby making it difficult to effect dispersion or to produce the desired lubricating effect. On the other hand, if the particle size is too large, it is difficult to disperse the particles and tends to cause fall-off of the particles from the coat. The shape of the particles may be spherical, oval or flat. Agglomerates of particles may be included.

The lubricating materials usable as the lubricant in present invention include anionic surfactants, cationic surfactants, ampholytic surfactants, noninonic surfactants, fluorine-based surfactants, organic carboxylic acids and their derivatives, higher aliphatic alcohols, paraffin, waxes, polyolefins, silicone compounds and the like. Of these materials, polyolefin or silicone compounds are preferred.

As the polyolefin lubricants, waxes, resins or rubber-like materials composed of a homopolymer or copolymer of 1-olefinic unsaturated hydrocarbon such as ethylene, propylene, 1-butene, 4-methyl-1-pentene, etc., for example, polyethylene, polypropylene, poly-1-butene, poly-4-methyl-1-pentene, ethylene-propylene copolymer, ethylene-1-butene copolymer, propylene-1-butene copolymer, etc.; aliphatic dicarboxylic acids such as azelaic acid, sebacic acid, etc.; and oxycarboxylic acids such as oxybenzoic acid and ester forming derivatives thereof may be exemplified.

As the silicone-compound lubricants, unmodified silicones such as dimethylpolysiloxane, and silicons modified with a polar group such as fatty acids, polyethers, alcohols, and alkyl group may be exemplified. Silicones modified with the polar group have good affinity for binder resins.

The "vertical protuberance-forming resins" refer to the compounds affecting a phase separation or stretching characteristics in the layer. Some methods of forming the protuberances by using these compounds are described below. In coating method, a coating solution containing a water-soluble polymer such as, specifically, cellulose, gelatin, polyacrylic acid and its salts, polystyrenesulfonic acid and its salts, is coated on a polyester film in the course of the film forming process and the coated film is stretched. It is possible to employ other methods as well.

It is possible to use two or more of the said lubricants in admixture. Also, joint use of particles and lubricant materials, lubricant materials and vertical protuberances-forming resins, and vertical protuberances-forming resins and particles, is effective for the purpose of present invention.

The lubricant, when applied, is dispersed with a resin binder in water or an organic solvent.

The content of the lubricant in the coating layer is in the range of 0.5 to 40% by weight, preferably 1 to 20% by weight. When the lubricant content is too small, the obtained coating layer (A) may not be provided with the desired slipperiness. On the other hand, when the lubricant content is too large, the coating film strength may lower.

As the resin binders used in the present invention, polyesters, polyamides, polystyrenes, polycarbonates, polyarylates, polyacrylates, polyvinyl chloride, polyvinylidene chloride, polyvinyl butyral, polyvinyl alcohol, phenoxy resins, polyimides, epoxy resins, polyurethanes, silicon resins, etc., and the copolymers of the monomers constituting the said resins and mixture thereof may be exemplified.

Among these resins, urethane resins, polyesters and resins composed of urethane resins or polyesters as a skeleton resin are preferable.

The urethane resins are composed of, for example, the following polyols, polyisocianates, chain-lengthening materials and crosslinking agents.

As the polyols, polyethers such as polyoxyethylene glycol, polyoxypropylene glycol and polyoxytetramethylene glycol, polyesters such as polyethylene adipate, polyethylene-butylene adipate and polycaprolactone, acrylic polyols and castor oil may be exemplified.

As the polyisocyanates, tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate may be exemplified.

Examples of chain-lengthening materials or crosslinking agents are ethylene glycol, propylene glycol, diethylene glycol, trimethylolpropane, hydrazine, ethylenediamine, diethylenetriamine, 4,4'-diaminophenylmethane, 4,4'-diaminodicyclohexylmethane and water.

As the components forming the polyesters, the following polycarboxylic acid and polyhydroxy compound may be exemplified.

As the polycarboxylic acid, telephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalate, 5-sodium sulfoisophthalate, adipic acid, azelaic acid, sebacic acid, dodecanedicarboxylic acid, trimellitic acid, trimesic acid, trimellitic anhydride, phthalic anhydride, p-hydroxybenzoic acid, trimellitric acid monopotassium salt and the ester-forming derivatives thereof may be exemplified.

As the polyhydroxy compound, ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylyene glycol, bisphenol A-ethylene glycol additives, diethylene glycol, triethylene glycol, polyethylene glycol, polypropylene glycol, polytetramethylene glycol, polytetramethyleneoxide glycol, dimethylolpropionic acid, glycerin, trimethylolpropane, sodium dimethylolethyl sulfonate and potassium dimethylolpropionate may be exemplified.

At least one compound is selected from each of the groups, and the selected compounds are synthesized by ordinary polycondensation to produce the polyesters.

The polyesters in the present invention also includes composite resins having a polyester component such as an acrylic-grafting polyester and polyester polyurethane obtained by chain-lengthening a polyester polyol which are described in Japanese Patent Application Laid-Open (KOKAI) No. 1-165633 (1989).

It is preferred in the coating solution used in the present invention that water is used as a medium from the viewpoint of safety and hygiene. The coating solution can also contain an organic solvent as an assistant of such resins within the scope of the present invention. When water is used as a medium, the coating solution may be obtained by forcibly dispersing such resin by a surfactant or the like, but it is preferably a self-dispersion-type resin having a hydrophilic nonionic component such as polyethers or a cationic group such as a quaternary ammonium salts, more preferably a water-soluble or water-dispersible resin having an anionic group.

The water-soluble or water-dispersible resin having an anionic group of the present invention is obtained by copolymerizing or grafting the said resin as a skeleton resin with compounds having an anionic group. As the anionic group, sulfonic acid, carboxylic acid, phosphoric acid and a salt thereof are preferable. In order to impart a water solubility to the resin, as the counter ions to the anionic group are used alkali metal ions (lithium ion, sodium ion or potassium ion), or ammonium ion. The amount of anionic group in the water-soluble or water-dispersible resin having the anionic group is preferably 0.05 to 8 wt %. If the anionic group content is less than 0.05 wt %, the water solubility or water dispersibility of the resin is sometimes lowered. On the other hand, if the anionic group content exceeds 8 wt %, the water resistance of the coating layer is sometimes lowered.

As the polyesters of the water-soluble or water-dispersible resins used in the present invention, polyesters having Tg of not more than 80° C., preferably 0 to 70° C.; more preferably polyesters having sulfonate ($-SO_3M$) group; still more preferably polyesters wherein an acidic moiety contains 1 to 20 mol % of sulfo aromatic dicarboxylic acid unit or salts thereof unit; most preferably polyesters wherein an acidic moiety contains 1 to 20 mol % of sulfoisophthalic acid unit or salts thereof unit, are preferred.

As the urethane resins of the water-soluble or water-dispersible resins used in the present invention, urethane resins having carboxylic acid group ($-COOH$) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit, are preferred.

An amount of the resin binders in the coating layer is 60 to 99.5 wt %, preferably 70 to 90 wt %.

In order to improve the sticking property (blocking property), water resistance, solvent resistance and mechanical strength of the coating layer, the coating solution used in the present invention may contain, as crosslinking agent, methylol urea compounds, alkylol urea compounds, melamine compounds, guanamine compounds, acrylamide compounds, polyamide compounds, epoxy compounds, aziridine compounds, block polyisocyanates, silane coupling agents, titanium coupling agents, zirco-aluminate type coupling agents, peroxides, heat and light reactive compounds, photosensitive resins or the like.

The coating solution may further contain, if necessary, a defoaming agent, a coaterbility improving agent, a thickening agent, an antistatic agent, an organic lubricant, an antioxidant, an UV absorber, a foaming agent, a dye, a pigment and other additives.

As methods of applying the above-described coating solution to the polyester film, there are a method of applying the coating solution by using a reverse roll coater, gravure coater, rod coater, air doctor coater or another coating equipments as described in "Coating method" by Yuzi Harasaki, published by Maki Shoten, 1979, before, between or after the stretching steps, and a method of applying the coating solution by using the above-described coating equipments in the process of producing the biaxially stretched polyester film, is preferred. As a method of applying the coating solution in the process of producing the biaxially stretched polyester film, a method of applying the coating solution to an un-stretched polyester film and successively or simultaneously biaxially stretching the film; a method of applying the coating solution to a uniaxially stretched polyester film and stretching the resultant film in the direction perpendicular to the uniaxial direction; and a method of applying the coating solution to a biaxially stretched film and further stretching the resultant film in the transverse and/or machine direction(s) can be cited.

The thickness of the coating layer (A) is 0.01 to 1 μm, preferably 0.02 to 0.2 μm.

The biaxially oriented polyester film and polyester layer (A) co-extruded with the polyester film, which have a specific surface property ( center-line average roughness= 0.005 to 0.2 μm) contains a lubricant so as to form the surface property which is a center line average roughness ($Ra^4$) of 0.005 to 0.2 μm, and are produced by known methods, i.e. U.S. Pat. No. 5,069,962.

Any of the known pertinent methods can be used for forming the said co-extruded polyester layer. As the resins of the co-extruded polyester layer (A), a polyester, is preferred in view of re-use of the polyester film.

As the components of such a polyester, there can be used various polyvalent carboxylic acids and polyvalent hydroxyl compounds. As the polyvalent carboxylic acids, terephthalic acid, isophthalic acid, orthophthalic acid, phthalic acid, 4,4'-diphenyldicarboxylic acid, 2,5-naphthalenedicarboxylic acid, 2, 6-naphthalenedicarboxylic acid, 1,4-cyclohexanedicarboxylic acid, 2-potassium sulfo terephthalic acid, 5-sodium sulfo isophthalic acid, adipic acid, azelaic acid, sebacic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salts and their ester-forming derivatives may be exemplified. As the polyvalent hydroxyl compounds, ethylene glycol, 1,2-propylene glycol, 1,3-propylene glycol, 1,3-propanediol, 1,4-butanediol, 1,6-hexanediol, 2-methyl- 1,5-pentanediol, neopentyl glycol, 1,4-cyclohexanedimethanol, p-xylene glycol, bisphenol A-ethylene glycol additive, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate and potassium dimethylolpropionate may be exemplified.

One or more of the said carboxylic acids and one or more of the said hydroxyl compounds are selected and subjected to an ordinary polycondesation reaction, thereby obtaining a polyester.

The "polyesters" used for the co-extruded polyester layer (A) in the present invention include the compounds having polyester units. As examples of the compounds having polyester units, the composite polymers such as polyester polyurethane obtained by chain-lengthening a polyester polyol with an isocyanate compound, polyesterpolyacryl copolymer, etc., can be mentioned.

As the lubricant to be contained in the said polyester, the particles, the lubricating materials and the vertical protuberance-forming resins mentioned above can be used. The average particle size of the lubricant particles is preferably 0.005 to 2 μm.

The lubricant content in the polyester is preferably 0.001 to 30 wt %, more preferably 0.005 to 10 wt %.

In case of using the vertical protuberance-forming resins in the co-extrusion method, a polyester and a polyolefin having poor affinity for the polyester are mixed and melt extruded, and the extruded sheet is stretched at least monoaxially.

As the co-extruded polyester layer (A), a polyester film composed of a crystalline polyester may be used.

The crystalline polyester used in the present invention is a polymer obtained by polycondensing an aromatic dicarboxylic acid such as terephthalic acid, naphthane-2,6-dicarboxylic acid or the like and an aliphatic glycol such as ethylene glycol, diethylene glycol, tetramethylene glycol, neopentyl glycol or the like. Typical examples of such polymers are polyethylene terephthalate (PET) and polyethylene-2,6-naphthalene dicarboxylate (PEN). As the crystalline polyester, homopolymers thereof as well as polymers obtained by copolymerizing other aromatic or aliphatic dicarboxylic acid with diol in an amount not affecting the crystallinity, for example, not more than 10 mol %, preferably not more than 5 mol %. It is possible to blend other polymers such as polyamides, polyolefins, polycarbonates, etc , in an amount not more than 10 wt %. However, the blending amount should be made within limits not causing excessive deterioration of crystallinity or excessive roughening of the film surface.

The thickness of the co-extruded polyester film (A) is 0.1 to 10 μm, preferably 0.3 to 5 μm.

The coating layer which does not substantially contain lubricants, and has the surface with a center-line average roughness(Ra) of not more than 0.005 μm and the thickness of not more than 5 μm, may be formed on the surface of the optical recording layer side of the substrate for improving the adhesive to the optical recording layer, by applying a coating solution in which the same resin binder as the coating layer (A) is dissolved or finely dispersed in water or an organic solvent. In this case, it is preferable to use a resin whose a glass transition temperature (Tg) is lower than that of the biaxially oriented polyester film, since the advantages of the present invention can be effectively attained by using such a resin. The Tg of the resin used for the coating layer of the present invention is preferably not more than 70° C., more preferably 0° to 60° C., still more preferably 5° to 50° C.

Of the above-mentioned resin usable for forming the coating layer, acrylic resins, urethane resins and polyesters are preferred. Among of them, the same urethane resins and polyesters as used in the coating layer (A) is the most preferred.

It is also preferred in the coating solution used in the present invention that water is used as a medium from the viewpoint of safety and hygiene. The coating solution may also contain an organic solvent as an assistant of such resins within the scope of the present invention. When water is used as a medium, the coating solution may be obtained by forcibly dispersing such resin by a surfactant or the like, but it is preferably a self-dispersion-type resin having a hydrophilic nonionic component such as polyethers or a cationic group such as a quaternary ammonium salts, more preferably water-soluble or water-dispersible high-molecular weight compounds (water-soluble or water-dispersible resins) having an anionic group.

Such the water-soluble or water-dispersible resin having an anionic group of the present invention is the same resin as used in the coating layer (A).

As the polyesters of the water-soluble or water-dispersible resins used in the present invention, polyesters having Tg of not more than 80° C., preferably 0° to 70° C.; more preferably polyesters having sulfonate (—$SO_3M$) group; still more preferably polyesters wherein an acidic moiety contains 1 to 20 mol % of sulfo aromatic dicarboxylic acid unit or salts thereof unit; most preferably polyesters wherein an acidic moiety contains 1 to 20 mol % of sulfo isophthalic acid unit or salts thereof unit, are also preferred.

As the urethane resins of the water-soluble or water-dispersible resins used in the present invention, urethane resins having carboxylic acid group (—COOH) or salts thereof as a hydrophilic group; more preferably urethane resins wherein a polyol moiety contains not less than 50 mol %, preferably not less than 70 mol % of polyester polyol unit; still more preferably urethane resins wherein a isocyanate moiety contains not less than 50 mol %, preferably not less than 70 mol % of aromatic diisocyanate unit and/or isophorone diisocyanate unit, are also preferred.

An amount of the resin binders in the said coating layer is not less than 50 wt %, preferably not less than 60 wt %, more preferably not less than 80 wt %.

In order to improve the sticking property (blocking property), water resistance, solvent resistance and mechanical strength of the coating layer, the coating solution used in the present invention may contain, as crosslinking agent, methylol urea compounds, alkylol urea compounds, melamine compounds, guanamine compounds, acrylamide compounds, polyamide compounds, epoxy compounds, aziridine compounds, block polyisocyanates, silane coupling agents, titanium coupling agents, zirco-aluminate type coupling agents, peroxides, heat and light reactive compounds, photosensitive resin or the like.

The coating solution may further contain, if necessary, a defoaming agent, a coaterbility improving agent, a thickening agent, an antistatic agent, an organic lubricant, an antioxidant, an UV absorber, a foaming agent, a dye, a pigment and other additives.

Concerning the said coating layer, the term of "does not substantially contain" means that the content of the particles having a particle size of not less than 0.25 µm is not more than 0.05 wt %. It is rather preferred that the surface roughness of the said coating layer becomes lower than that of the polyester film or the co-extruded polyester layer (B) having specific surface properties (i.e. the center-line average roughness (Ra)=not more than 0.005 µm, and the number of the coarse protuberances having a height of not less than 0.10 µm=not more than 10/cm$^2$). The above-described coating solution is applied on the surface of the substrate to form the coating layer in the same way as formation of the coating layer (A).

The coating layer may comprise any number of laminations as far as the object of the present invention is fulfilled, but the center line average roughness (Ra) of its side contacting with the optical recording layer should be not more than 0.005 µm, preferably not more than 0.003 µm and the number of the coarse protuberances having a height of not less than 0.10/cm$^2$.

Between the biaxially oriented polyester film and the co-extruded polyester layer (A) or (B), at least one layer composed of re-used or recycled polyester may be disposed.

The thickness of the substrate of the present invention is 5 to 100 µm.

One of substrates in which the following characteristics (I) to (III) are respectively endowed with the substrate described in (1) to (3) above, is preferably used in the present invention:

(I) A heat shrinkage of the substrate in the machine direction after 30 minute heat-treatment at a temperature of 150° C. is not more than 2.5%.

(II) The content of the deposited low-molecular weight components (compounds) on the surface of the substrate is less than 0.8% by weight.

(III) A heat shrinkage of the substrate in the machine direction after 30 minute heat-treatment at a temperature of 150° C. is not more than 2.5%, and the content of the deposited low-molecular weight components (compounds) on the surface of the substrate is less than 0.8% by weight.

The biaxially oriented polyester film can be obtained, for example, by a method which comprises melt-extruding polyester chips into a web at a temperature of 270° to 320° C., then cooling the resultant wed on a casting drum at a temperature of 40° to 80° C. to form an amorphous sheet, biaxially stretching the obtained amorphous sheet in the machine direction and transverse direction either successively or simultaneously, and heat-setting the stretched sheet at a temperature of 160° to 240° C.

When a substrate having a heat shrinkage in the machine direction of not more than 2.5% after the heat-treatment at a temperature of 150° C. for 30 minutes, there can be obtained an optical tape having excellent repeated recording characteristics. The heat shrinkage in the machine direction is preferably not more than 2.0%, more preferably not more than 1.5%. When the heat shrinkage exceeds 2.5%, the repeated recording characteristics may be lowered.

As the substrate, ones having a crystallinity of 45 to 55%, more preferably 47 to 53% is preferred. When the crystallinity is less than 45%, the repeated recording characteristics and polyester film workability may deteriorate. On the other hand, when the crystallinity exceeds 55%, although the repeated recording characteristics is not lowered, the mechanical strength thereof may lower.

The heat shrinkage in the transverse direction of the substrate after the heat-treatment at a temperature of 150° C.

for 30 minutes is preferably not more than 5.0%.

For obtaining a substrate having a desired heat shrinkage in the present invention, it is preferable to conduct 0.2 to 20% relaxation-set in the machine direction (longitudinal direction) in the cooling zone at the terminus of heat-set in the film forming process. However, these properties of the present invention may be affected according to the starting material of the polyester, for example, contents of the copolymeric components and crystallinity.

The content of the deposited low-molecular weight components on the substrate used in the present invention is less than 0.8% by weight, preferably less than 0.5% by weight. Such the substrate can be obtained by reducing, for example, the content of the low-molecular weight components therein as follow.

A polycondensation reaction by melting is carried out in the usual way to obtain a polyester having an intrinsic viscosity of about 0.45 to 0.60. Then this polyester is subjected to solid-state polymerization in the form of chips thereof. The solid-state polymerization may be conducted under a nitrogen stream or in vacua. Usually, the solid-state polymerization temperature is selected from the range of 190° to 250° C. and the polymerization time is selected from the range of 5 to 30 hours. There is consequently obtained a polymer having an intrinsic viscosity of about 0.7 to 0.9. This polymer is then subjected to a known film-forming process, for example, a process comprising the steps of melt-extruding the polyester chips into a web at a temperature of 270° to 320° C., cooling the obtained web on the casting drum to form an amorphous sheet, biaxially stretching the amorphous sheet in the machine direction and transverse direction either successively or simultaneously and heat-setting the stretched sheet, thereby obtaining a biaxially oriented film. In this process, it is preferable to minimize the residence time of the molten material in the extruder.

Generally, the flatter and smoother the surface of the polyester film, the more susceptible does it become to suffer damage such as scratches in the film forming process. It has been confirmed that the oligomers which have separated out from the film tend to adhere to the longitudinal stretching rolls, and this becomes a cause of scratching of the film in the longitudinal stretching process, and found that by using a polyester which has been reduced the content of the low-molecular weight components, the risk of the film being scratched in the longitudinal stretching process is lessened, and as a consequence, the optical tape produced by using the said film is remarkably improved in recording and reproducing characteristics.

As the optical recording layer formed on the substrate in the present invention, any of a write-once recording layer capable of recording only for once and a rewritable recording layer capable of repeating erasing can be used. As the rewritable type, a magneto-optic recording medium utilizing a magneto-optic effect or a phase-change medium utilizing a reversible change between a crystalline phase and amorphous phase. The optical recording layer of the present invention is composed of a dielectric layer, a recording layer and a reflective layer. The rewritable recording media comprise a layer constitution of substrate/dielectric layer/recording layer/dielectric layer/reflecting layer in the case of conducting the recording/reproducing of information by the irradiation of laser beam on the side of the base film, or comprise a layer constitution of substrate/reflecting layer/ dielectric layer/recording layer/dielectric layer in the case of irradiating the laser beam on the side of the optical recording layer.

The dielectric layer is used for a purpose of protecting a recording layer from a ready oxidation by moisture or oxygen and for a purpose of preventing a deformation of the recording layer, and usually, a transparent and high heat-resistant metal oxide, metal nitride, metal sulfide, inorganic carbide, etc. may be used.

As the metal oxide, metal oxides such as $Al_2O_3$, $Ta_2O_5$, SiO, $SiO_2$ and a mixture thereof, and composite oxides such as Al—Ta—O may be exemplified. Further, to the above-mentioned compounds, other elements, for example, Ti, Zr, Mo and Y in the form of an oxides alone or in combination with Al or Ta may be added. Since such metal oxides have a dense structure, they can prevent an infiltration of moisture or oxygen from the outside, have a high corrosion-resistance, and are less reactive with the magneto-optical recording layer or the phase change recording layer and excellent in adhesion with the resin.

As the metal nitrides, nitrides of metals such as Si, Al and Ge, composite nitrides of two or more of them and composite oxides thereof with Nb and Ta (for example, SiNbN, SiTaN) may be exemplified. Among them, Si-containing nitrides show more excellent effect. The metal nitrides are dense, can prevent an infiltration of moisture or oxygen from the outside and have a high corrosion-resistance.

As the metal sulfides, ZnS and a mixture with the above-mentioned metal oxide or metal nitride may be exemplified.

As the inorganic carbides, SiC or the like can be mentioned.

In the present invention, tantalum oxide ($Ta_2O_5$) and zinc sulfide (ZnS) are more preferred since they cause less cracking.

A preferred film thickness of the dielectric layer is about from 500 to 3,000 Å for the dielectric layer on the side of the substrate and about 100 to 3,000 Å on the side of the reflecting layer (outer side).

For the recording layer of the rewritable recording medium, there can be used alloys of rare earth elements and transition metals, for example, magneto-optical recording materials such as TbFeCo, GdTbFe, GdTbFeCo, GdDyFeCo and NdDyFeCo or phase-change recording materials such as Ge—Te alloys, Ge—Sb—Te alloys and In—Sb—Te alloys.

For the recording layer of the write-once recording medium, there can be used Te compounds such as Te—C, TeOx, Te—$CS_2$, Te—Sb, Te—Se—Te—Bi double layers and Te—Se, and organic photochromics.

The film thickness of the recording layer is preferably within a range from 100 to 2,000 Å.

The film thickness of the recording layer and the dielectric layer is selected so that the absorption efficiency for the laser beam is high, and the amplitude of recording signals, that is, the contrast between the recording state and the unrecording state is increased in view of the interference effect caused by multilayered constitution.

As the reflecting layer, a thin film of metal such as Al, Au, Ag and Ni having a high reflectance is usually used. The reflecting layer also has an effect of promoting the diffusion of heat-energy absorbed in the recording layer. The film thickness of the reflecting layer is preferably within a range from 200 to 3,000 Å. Further, a resin protecting layer composed of a UV-ray curable resin may be formed on the reflecting layer.

The recording layer, dielectric layer and reflecting layer are formed by a known vacuum thin-film forming method, for example, a vacuum-vapor deposition method, ion plating method or sputtering method. The sputtering method is recommended, particularly, with a view point of easy control of the composition and film thickness. The thickness of the recording layer or the like to be formed can be controlled by monitoring using a film thickness gage such as a quartz oscillator as a known technique.

An optical tape having a back-coating layer disposed by a known means on the side of the optical recording medium opposite to the vapor deposition surface thereof is more preferred. As the material of the back-coating layer, ones described in Japanese Patent Application Laid-Open (KOKAI) No. 62-245523 may be used.

The back-coating layer may be formed before the formation of the optical recording layer, but it is more preferable to form the layer after the formation of the optical recording layer.

The optical tape according to present invention is excellent in running quality as well as in optical recording and reproducing characteristics, and owing to these advantageous features, it has high industrial value.

EXAMPLES

The present invention will hereinafter be described more particularly by showing the examples, which examples however are merely intended to be illustrative and not to be construed as limiting the scope of the invention.

The evaluation methods employed in the Examples are as described below. In the following Examples and Comparative Examples, all "parts" are "parts by weight", unless otherwise specified.

(1) Center Line Average Roughness (Ra)

The center line average roughness on the surface of the substrate was determined as follows by using a surface roughness apparatus (SE-3F) [manufactured by Kosaka Institute Co.]. That is, a portion of a sampling length L (2.5 mm) was sampled in the direction of the center line from a film cross sectional curve. A value given by the following formula is represented by "µm" when expressing the roughness curve: y=f(x), indicating the center line for the sampled portion on the x-axis and the direction of the longitudinal stretching on the y-axis. The center line average roughness (Ra) is represented by determining ten cross sectional curves from the surface of the specimen film and expressed by an average value for the center line roughness of the sampled portion determined from the cross sectional curves. Further, the tip radius of the stylus was 2 µm, the load was 30 mg and the cut-off value was 0.08 mm.

$$Ra = \frac{1}{L} \int_0^L |f(x)| dx$$

(2) Number of coarse protuberances in the film surface

Aluminum was uniformly deposited, to a thickness of 400 to 500 Å or less, on the film surface to be measured, and the number (per 1 $cm^2$) of the coarse protuberances having a height of not less than 0.10 µm was counted by using a laser interference microscope (ZYGO Maxim 3D 5700) at a measuring wavelength of 0.633 µm and a magnification of X200.

(3) Crystallinity $X_c$ (%)

The crystallinity was determined according to the densitometry for calculation of crystallinity of films (POLYESTER FIBERS, p. 200, Corona Co., Ltd. Jan. 10, 1970).

$$\chi_c = \frac{d_k(d - d_a)}{d(d_k - d_a)} \times 100$$

wherein d: measured density $d_k$: density of perfect crystal phase (1.455 g/cm)

$d_a$: density of perfect amorphous phase (1.335 g/cm)

(4) Heat shrinkage (%)

Each sample film was heat-treated in a tensionless state in an atmosphere of a temperature of 150° C. for 30 minutes and the sample film lengths before and after the heat-treatment were measured. The heat shrinkage was calculated from the following formula.

$$\text{Heat shrinkage} = \frac{S0 - S1}{S0} \times 100$$

wherein $S_0$: sample length before heat-set $S_1$: sample length after heat-set (5) Measurement of deposition of low-molecular weight components (%)

About 5 g of sample film measuring 5 mm in width and 20 mm in length was precisely weighed and subjected to a deposition-treatment with chloroform for 24 hours in a Soxhlet extractor. The weight of the film after dried was measured and the amount of the low-molecular weight components deposited was determined from the following formula.

$$\text{Low-molecular weight components} = \frac{W0 - W1}{W0} \times 100$$

wherein $W_0$: weight before deposition $W_1$: weight after deposition

EXAMPLE 1

0.06 parts of magnesium acetate and 0.002 parts of lithium acetate were added to 100 parts of dimethyl terephthalate and 70 parts of ethylene glycol, and an ester exchange reaction was carried out in the usual way. To the resulting product was added 0.015 parts of trimethyl phosphate, and 10 minutes thereafter, 0.005 parts of antimony trioxide was further added. This was followed by 3-hour polycondensation reaction in the usual way to obtain a polyester having an intrinsic viscosity of 0.64 (measured in o-chlorophenol at a temperature of 25° C.). The haze of the solution of the produced polyester was 0.2%.

The obtained polyester was dried at a temperature of 180° C., melt extruded at a temperature of 287° C. and rapidly cooled on a casting drum maintained at a temperature of 45° C. to obtain an amorphous sheet of 175 μm in thickness. This amorphous sheet was first stretched 2.4 times in the machine direction at a temperature of 84° C. and then further stretched 1.25 times in the same direction at a temperature of 95° C., and thereafter the surface on one side of the resultant film was coated with an aqueous coating composition composed of 95 parts of an aqueous polyester comprising 92 mol % of terephthalic acid and 8 mol % of sodiumsulfoisophthalic acid as dicarboxylic acid moiety, and 75 mol % of ethylene glycol and 25 mol % of diethylene glycol as glycol moiety, 5 parts of silica so having an average particle size of 0.07 μm and 1,900 parts of water. The thus obtained film was then further stretched 3.9 times in the transverse direction at a temperature of 120° C. and heat-set at a temperature of 230° C. to obtain a substrate having a thickness of 15.06 μm (thickness of the biaxially stretched polymer film is 15 μm and thickness of the coating layer is 0.06 μm).

The center-line average roughness ($Ra^B$) of the surface on the noncoated side (flat and smooth side) of the thus obtained substrate was 2 nm, and the number of the protuberances having a height of not less than 0.10 μm in the surface thereon was 1/cm². The center-line average roughness ($Ra^A$) of the surface of the coating layer of the substrate was 6 nm.

On the flat and smooth side of the obtained continuous film of 15.06 μm in thickness, there were formed successively an Al reflective layer of 1,000 Å in thickness, a $Ta_2O_5$ dielectric layer of 1,500 Å in thickness, a $Ge_{22}Sb_{28}Te_{50}$ (atom%) recording layer of 700 Å in thickness and a $Ta_2O_5$ dielectric layer of 750 Å in thickness by sputtering in vacua in a same chamber to form a phase change recording medium.

The obtained phase change recording medium was let run at a linear velocity of 4 m/s and irradiated with semiconductor laser-light via the recording layer to record a signal of 1 MHz. Consequently, a good C/N ratio of not less than 50 dB was obtained, and there seldom occurred dropout. This recording medium was also capable of overwrite.

EXAMPLE 2

On the substrate obtained in Example 1, there were formed successively an Al reflective layer of 1,000 Å in thickness, a $Ta_2O_5$ dielectric layer of 900 Å in thickness, a $Tb_{22}Fe_{70}Co_8$ (atom %) recording layer of 400 Å in thickness and a $Ta_2O_5$ dielectric layer of 750 Å in thickness by sputtering in vacua in a same chamber to form a magneto-optical recording medium.

The obtained magneto optical recording medium, after erasing in the lump with an electromagnet, was let run at a linear velocity of 4 m/s and irradiated with semiconductor laser-light via the recording layer while applying a biased magnetic field of 200 Oe to record a signal of 1 MHz. A good C/N ratio of not less than 50 dB was obtained, and there seldom occurred dropout.

Comparative Example 1

A continuous film of 15.06 μm in thickness was obtained in the same way as Example 1 except that the amount of antimony trioxide added as polymerization catalyst was changed to 0.04 parts. The haze of the polyester solution was 1.6%. The $Ra^B$ of the obtained substrate was 3 nm, and the number of the protuberances having a height of not less than 0.10 μm was 60/cm². On this continuous film of 15.06 μm in thickness was formed an optical recording layer in the same way as Example 1 to obtain an optical tape. The C/N ratio of this tape was 47 dB, and there frequently occurred dropout.

Comparative Example 2

A continuous film of 15.06 μm in thickness was obtained in the same way as Example 1 except that 0.5% by weight of silica particles having an average size of 0.08 μm were added prior to the polycondensation reaction. The $Ra^B$ of the substrate was 6 nm, and the number of the protuberances having a height of not less than 0.10 μm was 7/cm².

A recording layer was formed on this continuous film of 15.06 μm in thickness in the same way as Example 1 to make an optical tape. The C/N ratio of this tape was 42 dB.

The results obtained in the Examples and the Comparative Examples described above are shown collectively in Table 1.

TABLE 1

|  | Ra$^A$ (nm) | Ra$^B$ (nm) | Number of coarse protuberances (per cm²) | Optical recording characteristics |
| --- | --- | --- | --- | --- |
| Example 1 | 6 | 2 | 1 | ○ |
| Example 2 | 6 | 2 | 1 | ○ |
| Comp. Example 1 | 7 | 3 | 60 | △ |
| Comp. Example 2 | 8 | 6 | 7 | △ |

EXAMPLE 3

100 parts of dimethyl terephthalate, 69 parts of ethylene glycol, 0.8 parts of diethylene glycol and 0.09 parts of calcium acetate (used as catalyst) were subjected to an ester-exchange reaction in the usual way. Then 0.01 part of antimony trioxide, 0.3 parts of lithium acetate and 0.2 parts of trimethyl phosphate were added and the resultant mixture was subjected to a polycondensation reaction in a known way to obtain polyethylene terephthalate (PET) having an intrinsic viscosity of 0.63.

The thus obtained polyester was dried, melt-extruded at a temperature of 285° C. and quickly cooled on a casting drum to form an amorphous sheet. This film was first stretched 3.5 times in the machine direction at a temperature of 90° C., and then the surface on one side of the film was coated with an aqueous coating composition composed of 95 parts of an aqueous polyester comprising 92 mol % of terephthalic acid and 8 mol % of sodiumsulfoisophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water. The thus obtained film was then stretched 4.0 times in the transverse direction at a temperature of 105° C., heat-set at a temperature of 225° C. and then relaxed 3% in the machine direction in the cooling zone at the terminus of heat-set to obtain a substrate having a thickness of 15.06 μm (thickness of the biaxially stretched polymer film is 15 μm and thickness of the coating layer is 0.06 μm). The center-line average roughness (Ra$^B$) of the surface on the flat and smooth side, longitudinal heat shrinkage and crystallinity of the thus obtained substrate were as shown in Table 2.

On the surface of the flat and smooth side of the obtained continuous polyester film of 15.06 μm in thickness, there were formed successivly an Al reflective layer of 1,000 Å in thickness, a Ta$_2$O$_5$ dielectric layer of 900 Å in thickness, a Tb$_{22}$Fe$_{70}$Co$_8$ (atom %) recording layer of 400 Å in thickness and a Ta$_2$O$_5$ dielectric layer of 750 Å in thickness by sputtering in vacua in a same chamber to form a magneto-optical recording medium.

This magneto-optical recording medium was subjected to repeated recording test of 104 times, but it suffered no deterioration of noise level and showed high durability.

EXAMPLES 4–5

The substrate having different crystallinity and heat shrinkage were produced by the same procedure as Example 3 except for changing the stretching ratios in the machine and transverse directions, heat-set temperature and relaxing conditions.

An optical recording layer was formed on each of the thus obtained continuous films to form a magneto-optical recording medium, and it was subjected to a repeated recording test of 10$^4$ times. The optical tapes in which the longitudinal heat shrinkage or the crystallinity of the substrate were out of the ranges specified in the present invention were deteriorated in noise level after the said repeated recording test. The results of evaluation of the obtained optical tapes are shown in Table 2.

TABLE 2

|  | Ra$^A$ (nm) | Ra$^B$ (nm) | Longitudinal heat shrinkage (%) | Crystallinity (%) | Repeated recording characteristics |
| --- | --- | --- | --- | --- | --- |
| Example 3 | 6 | 2 | 0.5 | 50.7 | ○ |
| Example 4 | 6 | 2 | 0.8 | 48.5 | ○ |
| Example 5 | 6 | 2 | 1.5 | 52.6 | ○ |

EXAMPLE 6

By using 100 parts of dimethyl terephthalate, 65 parts of ethylene glycol and 0.09 parts of calcium acetate, an ester exchange reaction was carried out according to a conventional method. Then 0.04 parts of phosphoric acid and 0.01 part of antimony trioxide were added and the resultant mixture was subjected to a polycondensation reaction in the usual way to obtain polyethylene terephthalate (PET) having an intrinsic viscosity of 0.55.

The obtained polyester was cut into the rectangular parallelepidal pieces having dimensions of approximately 4 mm×4 mm×2 mm, and they were subjected to a solid-state polymerization treatment in a rotary vacuum polymerizer under a reduced pressure of 1.0 mmHg at a temperature of 220° C. for 24 hours to obtain a polyester having an intrinsic viscosity of 0.75.

The thus obtained polyester was dried and extruded onto a casting die from an extruder die at a temperature of 290° C. to obtain an amorphous sheet having a thickness of 175 μm. This amorphous sheet was first stretched 2.4 times in the machine direction at a temperature of 84° C. and then further stretched 1.25 times in the same direction at a temperature 95° C. Thereafter, the surface on one side of the film was coated with an aqueous coating composition composed of 95 parts of an aqueous polyester comprising 92 mol % of terephthalic acid and 8 mol % of sodiumsulfoisophthalic acid as dicarboxylic acid moiety and 75 mol % of ethylene glycol and 25 mol % of diethylene glycol as glycol moiety, 5 parts of silica sol having an average particle size of 0.07 μm and 1,900 parts of water. The obtained film was stretched 3.9 times in the transverse direction at a temperature of 120° C. and heat-set at a temperature of 230° C. to obtain a substrate having a thickness of 15.06 μm (thickness of the biaxially stretched polymer film is 15 μm and thickness of the coating layer is 0.06 μm) and an intrinsic viscosity of 0.710.

The center-line average roughness (Ra$^B$) of the surface on the noncoated side (flat and smooth side) of the obtained substrate was 2 nm, and the deposition ratio of low-molecular weight components after the deposition-treatment for 24 hours by a Soxhlet extractor using chloroform was 0.45% by weight.

The surface on the flat and smooth side of the substrate remained free of scratch through the 48-hour continuous film-forming process.

On the surface of the flat and smooth side of the continuous film of 15.06 μm in thickness after 40 hours from the beginning of the film-forming process, there were formed successively an Al reflective layer of 1,000 Å in thickness, a $Ta_2O_5$ dielectric layer of 1,500 Å in thickness, a $Ge_{22}Sb_{28}te_{50}$ (atom %) recording layer of 700 Å in thickness and a $Ta_2O_5$ dielectric layer of 750 Å in thickness by sputtering in vacua in a same chamber to form a phase change recording medium.

This phase change recording medium was let run at a linear velocity of 4 m/s and exposed to semiconductor laser light via the recording layer to record a signal of 1 MHz. There was obtained a good C/N ratio of not less than 50 dB. Also, this recording medium was capable of overwrite.

EXAMPLE 7

On the continuous film obtained in Example 6, there were formed successively an Al reflective layer of 1,000 Å in thickness, a $Ta_2O_5$ dielectric layer of 900 Å in thickness, a $Tb_{22}Fe_{70}Co_8$ (atom %) recording layer of 400 Å in thickness and a $Ta_2O_5$ dielectric layer of 750 Å in thickness by sputtering in vacua in a same chamber to form a magneto-optical recording medium.

This magneto-optical recording medium, after erasing in the lump with an electromagnet, was let run at a linear velocity of 4 m/s and exposed to semiconductor laser light via the recording layer while applying a biased magnetic field of 200 Oe to record a signal of 1 MHz. Consequently, a good C/N ratio (not less than 50 dB) was obtained.

Comparative Example 3

A continuous film of 15 μm in thickness was produced by the same procedure as Example 6 except that 0.2% by weight of silica having an average particle size of 0.17 μm was added prior to the polycondensation reaction. The $Ra^B$ of the flat and smooth side of the obtained film was 7 nm and its intrinsic viscosity was 0.705. The deposition ratio of low molecular weight material after the deposition-treatment for 24 hours by a Soxhlet extractor was 0.43% by weight.

The surface on the flat and smooth side of the film remained free of scratch through the 48-hour continuous film-forming process.

An optical tape was made by forming an optical recording layer, in the same way as Example 6, on the continuous film of 15.06 μm in thickness after 40 hours from the beginning of the film-forming process. The C/R ratio of this optical tape was 42 dB.

The results obtained in Examples 6 and 7 and Comparative Example 3 described above are shown in Table 3.

EXAMPLES 8 to 25

Optical tapes were produced in the same way as in Examples above except that the constructions and compositions were varied as shown in Table 4. The properties thereof are shown in Table 4.

TABLE 3

| | $Ra^A$ (nm) | Additive particles | $Ra^B$ (nm) | Intrinsic viscosity of film | Deposition of low-molecular weight component (wt %) | Scratch on flat side of film | Optical recording characteristics |
|---|---|---|---|---|---|---|---|
| Example 6 | 6 | None | 2 | 0.710 | 0.45 | ○ | ○ |
| Example 7 | 6 | None | 2 | 0.710 | 0.45 | ○ | ○ |
| Comp. Example 3 | 9 | $SiO_2$, 0.17 μm, 0.2 wt % | 7 | 0.705 | 0.43 | ○ | △ |

TABLE 4

| Examples | Base polyester film | Coating layer | Co-extruded polyester film (a) | Coating layer | Co-extruded polyester film (b) | Center-line average roughness (μm) $Ra^A$ | Center-line average roughness (μm) $Ra^B$ | Number of coarse protuberances (per cm²) | Deposition of low-molecular weight components (%) | Optical recording characteristics |
|---|---|---|---|---|---|---|---|---|---|---|
| Example 8 | Z-1 | — | Z-2 | — | — | 6 | 2 | 0 | 0.96 | ○ |
| Example 9 | Z-3 | — | — | — | Z-5 | 6 | 3 | 1 | 0.97 | ○ |
| Example 10 | Z-6 | Z-7 | — | — | Z-5 | 7 | 3 | 0 | 0.99 | ○ |
| Example 11 | Z-1 | — | Z-2 | Z-4 | — | 6 | 2 | 0 | 0.96 | ○ |
| Example 12 | Z-6 | — | Z-2 | — | Z-5 | 6 | 3 | 1 | 0.97 | ○ |
| Example 13 | Z-8 | — | Z-9 | — | — | 7 | 2 | 1 | 1.00 | ○ |
| Example 14 | Z-10 | — | — | — | Z-11 | 6 | 2 | 1 | 0.95 | ○ |
| Example 15 | Z-12 | Z-13 | — | — | Z-11 | 7 | 2 | 1 | 0.94 | ○ |
| Example 16 | Z-12 | — | Z-9 | — | Z-11 | 8 | 2 | 1 | 0.97 | ○ |
| Example 17 | Z-14 | — | Z-15 | — | — | 7 | 2 | 1 | 0.46 | ○ |
| Example 18 | Z-16 | — | — | — | Z-17 | 6 | 2 | 1 | 0.44 | ○ |

TABLE 4-continued

| Examples | Base polyester film | Coating layer (a) | Co-extruded polyester film (a) | Coating layer | Co-extruded polyester film (b) | Center-line average roughness (μm) $Ra^A$ | $Ra^B$ | Number of coarse protuberances (per cm²) | Deposition of low-molecular weight components (%) | Optical recording characteristics |
|---|---|---|---|---|---|---|---|---|---|---|
| Example 19 | Z-18 | Z-19 | — | — | Z-17 | 6 | 2 | 1 | 0.42 | ◯ |
| Example 20 | Z-18 | — | Z-15 | — | Z-17 | 7 | 2 | 1 | 0.43 | ◯ |
| Example 21 | Z-20 | Z-19 | — | — | — | 6 | 2 | 1 | 0.40 | ◯ |
| Example 22 | Z-20 | — | Z-21 | — | — | 6 | 3 | 1 | 0.41 | ◯ |
| Example 23 | Z-22 | — | — | — | Z-23 | 7 | 2 | 2 | 0.40 | ◯ |
| Example 24 | Z-24 | Z-19 | — | — | Z-23 | 8 | 2 | 1 | 0.44 | ◯ |
| Example 25 | Z-24 | — | Z-21 | — | Z-23 | 7 | 3 | 1 | 0.41 | ◯ |

(Notes)

Z-1: Same base polyester film (14 μm in thickness) as in Example 1.

Z-2: Co-extruded polyester film (a) (1 μm in thickness) was produced in the same way of the base polyester film as in Comparative Example 2.

Z-3: Same base polyester film (14 μm in thickness)as in Comparative Example 2.

Z-4: Coating layer (0.06 μm in thickness) was produced in the same way of the coating layer as in Example 1 except for using no silica sol.

Z-5: Co-extruded polyester film (b) (1 μm in thickness) was produced in the same way of the base polyester film as in Example 1.

Z-6: Same base polyester film (14 μm in thickness) as in Comparative Example 2.

Z-7: Same coating layer (a) (0.06 μm in thickness) as in Example 1.

Z-8: Same base polyester film (14 μm in thickness) as in Example 3.

Z-9: Co-extruded polyester film (a) (1 μm in thickness) was produced in the same way of the base polyester film as in Example 3 except for adding 0.5 wt % of silica particles having an average particle size of 0.08 μm.

Z-10: Base polyester film (14 μm in thickness) was produced in the same way as in Example 3 except for adding 0.5 wt % of silica particles having an average particle size of 0.08 μm, Z-11: Co-extruded polyester film (b) (1 μm in thickness) was produced in the same way of the base polyester film as in Example 3.

Z-12: Base polyester film (14 μm in thickness) was produced in the same way as in Example 3 except for using 0.04 part by weight of antimony trioxide.

Z-13: Same coating layer (a) (0.06 [μm in thickness) as in Example 3.

Z-14: Same base polyester film (14 μm in thickness) as in Example 6.

Z-15: Co-extruded polyester film (a) (1 μm in thickness) was produced in the same way of the base polyester film as in Example 6 except for adding 0.5 wt % of silica particles having an average particle size of 0.08 μm.

Z-16: Base polyester film (14 μm in thickness) was produced in the same way as in Example 6 except for adding 0.5 wt % of silica particles having an average particle size of 0.08 μm.

Z-17: Co-extruded polyester film (b) (1 μm in thickness) was produced in the same way of the base polyester film as in Example 6.

Z-18: Base polyester film (14 [μm in thickness) was produced in the same way as in Example 6 except for using 0.04 part by weight of antimony trioxide.

Z-19: Same coating layer (a) (0.06 μm in thickness) as in Example 6.

Z-20: Base polyester film (14 μm in thickness) was produced in the same way as in Example 3 except for using a polyester of a intrinsic viscosity of 0.75 which was produced in Example 6 as a starting material.

Z-21: Co-extruded polyester film (a) (1 μm in thickness) was produced in the same way of the base polyester film as in Example 3 except for adding 0.5 wt % of silica particles having an average particle size of 0.08 μm and using a polyester of a intrinsic viscosity of 0.75 which was produced in Example 6 as a starting material.

Z-22: Base polyester film (14 μm in thickness) was produced in the same way as in Example 3 except for adding 0.5 wt % of silica particles having an average particle size of 0.08 μm and using a polyester of a intrinsic viscosity of 0.75 which was produced in Example 6 as a starting material.

Z-23: Co-extruded polyester film (b) (1 μm in thickness) was produced in the same way of the base polyester film as in Example 3 and using a polyester of a intrinsic viscosity of 0.75 which was produced in Example 6 as a starting material.

Z-25: Base polyester film (14 μm in thickness) was produced in the same way as in Example 3 except for using 0.04 part by weight of antimony trioxide and using a polyester of a intrinsic viscosity of 0.75 which was produced in Example 6 as a starting material.

What is claimed is:

1. An optical tape comprising:

a substrate composed of a biaxially oriented polyester film having as an outer surface a surface (B), and a coating layer having as an outer surface a surface (A), and an optical recording layer on the surface B, wherein a center-line average roughness ($Ra^B$) on the surface B is not more than 0.005 μm and the number of coarse protuberances having a height of not less than 0.10 μm on the surface B is not more than 10 protuberances/cm², and wherein a center-line average roughness ($Ra^A$) on the surface A is 0.005 to 0.2 μm.

2. An optical tape according to claim 1, wherein the substrate comprises a biaxially oriented polyester film, a coating layer having said surface (A), and a co-extruded polyester layer having said surface (B).

3. An optical tape according to claim 1, wherein the coating layer comprises a resin binder and at least one lubricant selected from the group consisting of particles, a lubricating material, and a protuberance forming resin.

4. An optical tape according to claim 3, wherein the coating layer comprises a resin binder selected from the group consisting of polyesters, polyamides, polystyrenes, polycarbonates, polyarylates, polyacrylates, polyvinyl butyral, polyvinyl alcohol, phenoxy resins, polyimides, epoxy resins, polyurethanes, silicon resins, copolymers of the monomers constituting the said resins, and mixtures of two or more of the above.

5. An optical tape according to claim 3, wherein the coating layer comprises particles having an average size of 0.005 to 2 μm, wherein the particles are selected from the group consisting of particles of an inorganic material, particles of polymers, carbon particles and particles of a metal alkoxide hydrolyzate.

6. An optical tape according to claim 3, wherein the coating layer comprises a lubricant selected from the group consisting of an anionic surfactant, a cationic surfactant, an ampholytic surfactant, a nonionic surfactant, a fluorine-based surfactant, an organic carboxylic acid or a derivative thereof, a higher aliphatic alcohol, a paraffin, polyolefins, silicone compounds, and waxes.

7. An optical tape according to claim 3, wherein the coating layer comprises a protuberance-forming resin selected from the group consisting of cellulose, gelatin, polyacrylic acid or a salt thereof, and polystyrenesulfonic acid and a salt thereof.

8. An optical tape according to claim 1, wherein the biaxially oriented polyester film comprises a polyester obtained from polymerization using a polymerization catalyst in which the content of an antimony compound is less than 100 ppm.

9. An optical tape according to claim 1, wherein said substrate is one having not more than 2.5% of a heat shrinkage in a machine direction after 30-minute heat-treatment at a temperature of 150° C.

10. An optical tape according to claim 9, wherein a heat shrinkage in a transverse direction of said substrate after 30-minute heat-treatment at a temperature of 150° C. is not more than 5.0%.

11. An optical tape according to claim 1, wherein a deposition ratio of a low-molecular weight component in the substrate is less than 0.8% by weight.

12. An optical tape according to claim 2, wherein the coating layer comprises a resin binder and at least one lubricant selected from the group consisting of particles, a lubricating material, and a protuberance forming resin.

13. An optical tape according to claim 12, wherein the coating layer comprises a resin binder selected from the group consisting of polyesters, polyamides, polystyrenes, polycarbonates, polyarylates, polyacrylates, polyvinyl chloride, polyvinylidene chloride, polyvinyl butyral, polyvinyl alcohol, phenoxy resins, polyimides, epoxy resins, polyurethanes, silicon resins, copolymers of the monomers constituting the said resins, and a mixture of two or more of the above.

14. An optical tape according to claim 12, wherein the coating comprises particles having an average size of 0.005 to 2 μm selected from the group consisting of particles of an inorganic material, particles of polymers, carbon particles, and particles of a metal alkoxide hydrolyzate.

15. An optical tape according to claim 12, wherein the coating comprises a lubricant selected from the group consisting of an anionic surfactant, a cationic surfactant, an ampholytic surfactant, a nonionic surfactant, a fluorine-based surfactant, an organic carboxylic acid or a derivative thereof, a higher aliphatic alcohol, a paraffin, polyolefins, silicone compounds, and waxes.

16. An optical tape according to claim 12, wherein the coating comprises a protuberance-forming resin selected from the group consisting of cellulose, gelatin, polyacrylic acid or a salt thereof, and polystyrenesulfonic acid and a salt thereof.

17. An optical tape according to claim 2, wherein the co-extruded polyester layer having said surface (B) comprises a polyester obtained from polymerization using a polymerization catalyst in which the content of an antimony compound is less than 100 ppm.

18. An optical tape according to claim 2, wherein a deposition ratio of the low-molecular weight component in the substrate is less than 0.8% by weight.

19. An optical tape according to claim 1, wherein the substrate comprises a biaxially oriented polyester film, wherein said biaxially oriented polyester film comprises a polyethylene terephthalate in which not less than 80 mol % of the structural units is ethylene terephthalate, a polyethylene naphthalate in which not less than 80 mol % of the structural units is ethylene naphthalate, or a poly-1,4-cyclohexanedimethylene terephthalate in which not less than 80 mol % of the structural units is 1,4-cyclohexanedimethylene terephthalate.

20. An optical tape according to claim 1, wherein a center-line average roughness ($Ra^B$) on the surface B is not more than 0.003 μm and the number of coarse protuberances having a height of not less than 0.10 μm in the surface B is not more than 2 protuberances/cm$^2$.

21. An optical tape according to claim 1, wherein a center-line average roughness ($Ra^A$) on the surface A is from 0.005 to 0.008 μm.

22. An optical tape according to claim 1, wherein the optical recording layer comprises a dielectric layer, a recording layer, and a reflective layer.

23. An optical tape according to claim 1, wherein said substrate has a thickness of from about 15 to 100 μm.

24. An optical tape comprising:
a substrate composed of a biaxially oriented polyester film having as an outer surface a surface (B), and a co-extruded polyester layer having as an outer surface a surface (A), and
an optical recording layer on the surface B,
wherein a center-line average roughness ($Ra^B$) on the surface B is not more than 0.005 μm and the number of coarse protuberances having a height of not less than 0.10 μm on the surface B is not more than 10 protuberances/cm$^2$,
and wherein a center-line average roughness ($Ra^A$) on the surface A is 0.005 to 0.2 μm.

25. An optical tape according to claim 24, wherein the substrate comprises a biaxially oriented polyester film, a co-extruded polyester layer having said surface (A), and a co-extruded polyester layer having said surface (B).

26. An optical tape according to claim 24, wherein the co-extruded polyester layer having said surface (A) comprises a polyester obtained from polymerization using a polymerization catalyst in which the content of an antimony compound is less than 100 ppm.

27. An optical tape according to claim 24, wherein the substrate comprises a co-extruded polyester film having surface (A) which comprises a polyester containing fine inactive particles or a crystalline polyester.

28. An optical tape according to claim 24, wherein the biaxially oriented polyester film comprises a polyester obtained from polymerization using a polymerization catalyst in which the content of an antimony compound is less than 100 ppm.

29. An optical tape according to claim 24, wherein said substrate is one having not more than 2.5% of a heat shrinkage in a machine direction after 30-minute heat-treatment at a temperature of 150° C.

30. An optical tape according to claim 29, wherein a heat shrinkage in a transverse direction of said substrate after 30-minute heat-treatment at a temperature of 150° C. is not more than 5.0%.

31. An optical tape according to claim 24, wherein a deposition ratio of a low-molecular weight component in the substrate is less than 0.8% by weight.

32. An optical tape according to claim 25, wherein the co-extruded polyester layer having said surface (B) comprises a polyester obtained from polymerization using a polymerization catalyst in which the content of an antimony compound is less than 100 ppm.

33. An optical tape according to claim 25, wherein the substrate comprises a co-extruded polyester film having a surface (A) which comprises a polyester containing fine inactive particles or a crystalline polyester.

34. An optical tape according to claim 29, wherein a deposition ratio of the low-molecular weight component in the substrate is less than 0.8% by weight.

35. An optical tape according to claim 24, wherein the substrate comprises a biaxially oriented polyester film, wherein said biaxially oriented polyester film comprises a polyethylene terephthalate in which not less than 80 mol % of the structural units is ethylene terephthalate, a polyethylene naphthalate in which not less than 80 mol % of the structural units is ethylene naphthalate, or a poly-1,4-cyclohexanedimethylene terephthalate in which not less than 80 mol % of the structural units is 1, 4-cyclohexanedimethylene terephthalate.

36. An optical tape according to claim 24, wherein a center-line average roughness ($Ra^B$) on the surface B is not more than 0.003 μm and the number of coarse protuberances having a height of not less than 0.10 μm in the surface B is not more than 2 protuberances/cm².

37. An optical tape according to claim 24, wherein a center-line average roughness ($Ra^A$) on the surface A is from 0.005 to 0.008 μm.

38. An optical tape according to claim 24, wherein the optical recording layer comprises a dielectric layer, a recording layer, and a reflective layer.

39. An optical tape according to claim 24, wherein said substrate has a thickness of from about 15 to 100 μm.

40. An optical tape comprising:

a substrate composed of a biaxially oriented polyester film having as an outer surface a surface (A), and a co-extruded polyester layer having as an outer surface a surface (B), and an optical recording layer on the surface B, wherein a center-line average roughness ($Ra^B$) on the surface B is not more than 0.005 μm and the number of coarse protuberances having a height of not less than 0.10 μm on the surface B is not more than 10 protuberances/cm², and wherein a center-line average roughness ($Ra^A$) on the surface A is 0.005 to 0.2 μm.

41. An optical tape according to claim 40, wherein the co-extruded polyester layer comprises a polyester obtained from polymerization using a polymerization catalyst in which the content of an antimony compound is less than 100 ppm.

42. An optical tape according to claim 1, wherein a C/N ratio of said tape is not less than 50 dB.

43. An optical tape according to claim 24, wherein a C/N ratio of said tape is not less than 50 dB.

* * * * *